United States Patent
Arndt et al.

(10) Patent No.: US 6,707,820 B1
(45) Date of Patent: Mar. 16, 2004

(54) VIRTUAL CIRCUIT NETWORK DYNAMIC CHANNEL MANAGEMENT

(75) Inventors: Richard Edwin Arndt, Sanford, FL (US); Jerry Lee Corey, Longwood, FL (US)

(73) Assignee: Intervoice Limited Partnership, Reno, NV (US)

( * ) Notice: Subject to any disclaimer, the term of this patent is extended or adjusted under 35 U.S.C. 154(b) by 0 days.

(21) Appl. No.: 09/465,502

(22) Filed: Dec. 16, 1999

(51) Int. Cl.[7] .............................................. H04L 12/28
(52) U.S. Cl. .................... 370/395.2; 370/360; 370/386; 370/410; 379/229; 709/223; 709/227
(58) Field of Search .................................. 370/355, 360, 370/386, 395.2, 395.21, 395.3, 395.41, 395.42, 395.52, 400, 410; 379/229, 230; 709/220, 222, 223, 225, 227, 228, 229

(56) References Cited

U.S. PATENT DOCUMENTS

| | | | | |
|---|---|---|---|---|
| 5,509,010 A | * | 4/1996 | La Porta et al. ............ | 370/68.1 |
| 5,663,947 A | * | 9/1997 | Wille-Fier et al. ........... | 370/360 |
| 6,104,803 A | * | 8/2000 | Weser et al. ................. | 379/230 |
| 6,341,126 B1 | * | 1/2002 | Andersson et al. .......... | 370/351 |
| 6,496,482 B1 | * | 12/2002 | Kubota ........................ | 370/400 |

* cited by examiner

*Primary Examiner*—Dang Ton
*Assistant Examiner*—Shick Hom
(74) *Attorney, Agent, or Firm*—Fulbright & Jaworski LLP

(57) ABSTRACT

A method and system of managing virtual circuits for improved non-blocking fault tolerance in a multi-node virtual circuit network of resources is presented. On receiving a request for connection between two nodes in the multi-node network, a virtual circuit with a plurality of virtual circuit channels is set up between the two nodes. Each node may have more than one physical link equipped to it. Furthermore, the virtual circuit channel may be disconnected when there is no traffic between the nodes. A method for handling virtual circuit channel allocation and de-allocation that prevents conflicts in reuse of the channels before they are released by both nodes in the connection is also presented. A protocol to prevent race conditions between the nodes is also established providing improved bandwidth utilization in the multi-node network.

58 Claims, 4 Drawing Sheets

VIRTUAL CIRCUIT NETWORK DYNAMIC CHANNEL MANAGEMENT

RELATED APPLICATIONS

The present application is related to commonly assigned and concurrently filed U.S. patent application Ser. No. 09/465,497, entitled "VIRTUAL CIRCUIT NETWORK DYNAMIC CHANNEL MANAGEMENT", the disclosure of which is incorporated herein by reference.

TECHNICAL FIELD

This application relates generally to virtual circuit networks, and more specifically to a system and method for dynamic channel management providing expansion capability to computer telephony based applications.

BACKGROUND

The use of intelligent telephony based applications is increasing in multi-node telecommunication systems. Existing multi-node telecommunication systems using intelligent applications, such as an Interactive Voice Response (IVR) unit, provide a variety of services to customers. An IVR unit used to make outbound calls and/or to receive inbound calls allows vendors to automatically provide customers with an advertising or maintenance message. A node on such a multi-node system may be a processor-based system, such as a Personal Computer (PC), or any other resource capable of storing information. Furthermore, each node in such a multi-node system may have an interface to allow connections to be established between the different nodes. Moreover, the IVR allows customers to make inbound calls into the multi-node system where different nodes may have different applications residing on them. When a customer calls into the multi-node system of the vendor, the IVR presents the customer with a set of options to choose from, and based on the choices the call may be routed to different nodes in the network. Thus, the different nodes generally need to communicate with each other to provide the desired services to the customer.

Existing systems, however, allow only a limited number of nodes to be connected together to form the multi-node system. Furthermore, the different nodes have to be physically collocated because of the length of the serial bus or cable that is used to connect the different nodes together. The number of nodes that could be connected to the cable is further limited to prevent impairment of the signal on the cable. Moreover, due to the nature of the interface and the associated physical limitations, the nodes in the network are daisy chained to each other. When a caller calls on a telephone line attached to one of the nodes requesting services resident on another node, the call is connected through to the remote node using the serial bus or cable.

More recently, connection-oriented networks have been used to connect different nodes in a multi-node network. A connection-oriented network is a network specifically designed to support connection-oriented protocols. In a connection-oriented protocol, two network nodes of a multi-node network interact with one another to set up a connection between the nodes. When a connection request is made to a connection-oriented network, the network establishes a path between the source and destination nodes. The nodes may then be configured to route packets of data along the established path. A packet switched network that is connection-oriented may also be referred to as a Virtual Circuit (VC) network. Asynchronous Transfer Mode (ATM) networks are an example of virtual circuit networks. ATM architecture allows multiple nodes to be connected together and provides a backbone for data and voice communications.

Asynchronous Transfer Mode is a broadband networking technology that provides a mechanism for transporting voice and data between systems within a virtual circuit network. ATM technology may be used for both Local Area Networks (LANs) and Wide Area Networks (WANs). Thus, ATM may be used to knit local and wide area networks and services into a seamless whole.

Presently available ATM networks include data links for interconnecting a plurality of network switches. A plurality of nodes (such as workstations, personal computers, etc.) are connected to the network switches by way of links. The links have an input port and an output port with respect to each node. When a certain node ("source node") desires to communicate with another node ("destination node"), a routing for enabling the data transfer between them is selected and determined using identifiers. The topology uses switches that establish a logical circuit from the source node to the destination node, and may guarantee a quality of service (QOS) for that transmission. However, unlike telephone switches that dedicate circuits end to end, unused bandwidth in ATM's virtual circuits can be appropriated whenever available.

The ATM physical interface may be operated at 25.6, 155.52, or 622.08 MHZ full duplex. An ATM Network Interface Card (NIC) may be installed into each node, and connected to an ATM workgroup switch. The NIC provides the desired bridging between the ATM Network Interface and the internal PC Signal Computing System Architecture (SCSA) serial bus required to interface to other resource cards. Thus, connections could be established between the ATM Network Interface and the SCSA for call processing, call connectivity, etc. The SCSA is an internal bus used for interconnecting cards within a PC.

As previously discussed, ATM uses a connection-oriented packet switched protocol. The information to be communicated between the source and destination nodes is organized into a plurality of packets of fixed size. This fixed unit allows very fast switches to be built because the processing associated with variable-length packets is eliminated. For example, there is no need to process the packet to determine the end of the frame. Each packet has a fixed size of 53 bytes and comprises a header and an information field called the "payload". The header is usually a 5-byte header and the size of the payload is 48 bytes. The payload field stores the information to be transferred, and the header stores a variety of other informations related to the packet that is desirable for the transfer of information. The small size of the ATM packet also ensures that voice and video can be inserted into the stream frequently enough for real-time transmission.

Each packet is part of a virtual circuit, which is identified by a Virtual Path Identifier (VPI) and a Virtual Channel Identifier (VCI) parameter stored within the packet header. A virtual circuit may be a unidirectional virtual trunk carrying data. Since a VC is unidirectional, one receive and one transmit VC must be set up to provide a bi-directional path. Once a VC path is configured between a source node and a destination node within an ATM switch, all routing and switching of packets between the source node and destination node is performed by programmed hardwired logic that no longer requires microprocessor intervention. For transferring packets internally between ports, ATM switches utilize high-speed buses operating in gigabit per second ranges.

There are two primary types of virtual circuits. A Switched Virtual Circuit (SVC) is a VC that is dynamically setup and torn down using the ATM User Network Interface (UNI) end point-to-end point signaling protocol. The UNI protocol utilizes source and destination address information, provided by the node initiating the SVC request, to identify the two nodes requiring a VC Connection (VCC) through the ATM switch and then resolves these addresses to physical ports on the switch. The ATM switch has internal VC routing tables. Thus, on receiving the source and destination address information, it assigns a VPI/VCI translation to its internal VC routing tables. It is not necessary to use the same VPI/VCI at both the source and the destination ports, though often this may be the case. In addition, the same VPI/VCI may be used for both receive and transmit VC at one end. The UNI protocol provides the VPI/VCI assignment to each end point. Once the UNI protocol has completed setting up the SVC, either end point may begin sending packets to the other end by using the near-end assigned VPI/VCI route. The ATM switch performs the translations and switches the packets between the ports according to the stored routing tables. Thus, setting up a SVC between the source and destination nodes is similar in some respects to making a phone call over the Public Switched Telephone Network (PSTN).

The second VC type is called a Permanent Virtual Circuit (PVC). A PVC is statically configured on the ATM switch by downloading PVC routing information to the switch via a maintenance interface. The ATM switch stores and retains this PVC routing information in a programmable memory. A PVC is similar to a leased telephone line, in that it provides a permanent connection between two systems. Each time the ATM switch is powered on or reset, the PVC routing is restored from the program memory, along with end-to-end system connectivity.

When configuring either a SVC or PVC, a Quality of Service (QOS) is defined for all traffic carried by the VC. There are two primary ATM Adaptation Layer (AAL) protocols, which provide a specific QOS by guaranteeing specific minimum and maximum VC bandwidth. The AAL5 protocol is used to transport Undefined Bit Rate (UBR) data such as Transmission Control Protocol/Internet Protocol (TCP/IP) burst transaction traffic. The AAL1 protocol is used to transport Constant Bit Rate (CBR) data such as 64 KBPS Pulse Code Modulation (PCM) voice traffic. The ability to specify a QOS is an important feature of ATM, allowing voice and video to be transmitted smoothly and in real-time. A Constant Bit Rate (CBR) QOS guarantees bandwidth for the peak cell rate of the application and is most useful for real-time voice and video traffic. In some cases, depending on the ATM equipment and network configurations, AAL5 may be utilized to carry AAL1 traffic. This does not present a QOS problem, providing there is sufficient bandwidth end-to-end to insure traffic bottlenecks do not occur. When both AAL1 and AAL5 are being used, priority is given to the AAL1 packets. Unspecified Bit Rate (UBR) QOS provides a best effort transport of data. However, it does not guarantee available bandwidth. UBR QOS is very efficient, but not used for critical data. Other types of QOS that may be used are Available Bit Rate (ABR) QOS, Real-time Variable Bit Rate (rt-VBR) QOS, and non-real-time Variable Bit Rate (nrt-VBR) QOS. ABR QOS adjusts bandwidth according to congestion levels for LAN traffic. Rt-VBR supports interactive multimedia that requires minimal delays and nrt-VBR is used for burst transaction traffic.

In general, SVCs and PVCs may not be configured using the same VPI/VCI. Moreover, a number of VPI/VCI combinations are typically reserved for ATM signaling protocols and ATM network maintenance on the network. Once VC routing is configured between two ports on an ATM switch, packets may be transmitted between the nodes with each node using the near end VPI/VCI that identifies the VC route to the remote node. For example, assume that the ATM switch routing is configured with node 0 connected to port 0 using VPI/VCI 0/102, and node 1 connected to port 1 using VPI/VCI 0/105. Then node 0 would transmit packets to node 1 by setting the packet header parameters VPI/VCI to 0/102. In similar fashion, node 1 would send packets to node 0 by setting the packet header parameters VPI/VCI to 0/105. In order for each node in the system to communicate to all other nodes, one or several sets of a VC meshed networks are required. For example, an 8 node system would require a minimum configuration of 7 bi-directional VCs at each node in order for each node to connect to all of the 7 adjacent nodes. Therefore, it would require one set of 56 unidirectional VCs (or 28 bi-directional VCs), to be opened simultaneously for the connectivity to be non-blocking between all nodes. This configuration of VCs is often referred to as a meshed network and is shown in FIG. 7. FIG. 7 represents a schematic diagram of a meshed network 700 of virtual circuit paths between the nodes of an 8 node system to provide non-blocking from each node to every other node.

Since PCM data requires a CBR transport, a VC packet must be filled and transmitted periodically in order to maintain continuity of the PCM data stream at the receiver. Since the payload of an ATM packet is fixed at 48 bytes, up to 48 samples of 64 KBPS PCM voice channel may be transferred in a single packet. However, carrying only a single channel of PCM data would introduce an undesirable delay of at least 6 ms (48×125 $\mu$s) end-to-end. This is due to the fact that 48 PCM samples must first be accumulated at the transmitter before it can be sent in a packet to the receiver. In addition to the 6 ms delay, there are additional delays introduced by the packet assembly process at the transmitter, the ATM network, and the packet disassembly process at the receiver.

In order to minimize these delays, a VC may be configured in such a way as to multiplex two or more channels of PCM data simultaneously into the packet payload. But in order to maintain the CBR data stream end-to-end, the packet must be transmitted at a rate proportionally higher then that required by a single channel VC. For example, the end-to-end delay of a VC carrying two 64 KBPS PCM channels would be 3 ms less than compared to a VC carrying a single channel. Therefore, increasing the number of channels multiplexed into a VC and proportionally increasing the rate at which the VC packets are transmitted can reduce end-to-end delay. A typical configuration might configure 12 PCM channels per VC. If each node requires a non-blocking configuration of 48 channels to each adjacent node in an 8 node system, and each VC was configured for 12 channels, then it would require 4 sets (48/12) of 28 bi-directional VCs to create a non-blocking meshed network.

During the normal connect/disconnect process, VCs are opened and closed dynamically between nodes as needed to carry varying traffic loads. A CBR VC is opened specifying the number of PCM channels it is required to carry. Once opened, the VC immediately begins periodically transmitting null packets for the specified number of channels. As individual channels are activated in a VC, null packets begin to fill with PCM data. As individual channels are deactivated in a VC, the packets begin to fill with nulls. A VC is most bandwidth efficient when all channels are activated, and becomes less bandwidth efficient as channels are deactivated. When the last channel in a VC is deactivated, the VC is normally closed. Conditions often occur where it would be advantageous to aggregate the bandwidth of two or more inefficiently utilized VCs opened between two nodes into one VC. This aggregation process minimizes the ATM physical link bandwidth between the two nodes, and reduces the overall bandwidth on the ATM network. For example, if two 12 channel VCs were opened between two nodes and only 6 channels on each VC were active, then the physical link bandwidth could be reduced by moving the 6 active channels from the first VC to the second VC and closing the first VC. There may be limitations in the ATM network, such as physical link bandwidth, or the available VPI/VCI address ranges. In these cases, aggregation of VCs between any two nodes can minimize blocking conditions that can occur when one of the two nodes, which have inefficiently utilized VCs, attempts to open a VC to a third node. Additional links can be installed to increase available bandwidth between nodes, and provide alternate or redundant paths for transporting traffic between nodes.

Therefore, there is a need in the art to provide a system and method for managing the allocation, re-allocation and de-allocation of virtual circuits and virtual circuit channels for improved non-blocking fault tolerance of a multi-node VC network architecture of resources for computer telephony applications.

SUMMARY OF THE INVENTION

These and other objects, features and technical advantages are achieved by a system and method which provides an improved non-blocking fault tolerant multi-node virtual circuit network architecture of resources for Computer Telephony applications.

Telephony applications may be connected to virtual circuit networks, such as an ATM network, to provide desired characteristics to the different nodes. For example, a multi-node Interactive Voice Response (IVR) system attached to existing telephone networks may use an Asynchronous Transfer Node (ATM) network between nodes to connect customers calling in on one node, to agents on another node. Each node of such a network may have a Connection Control Processor (CCP) to form a connection between the nodes, such as a source node and a destination node, in the network. The CCP may be comprised of multiple hardware and software sub-process mechanisms. Furthermore, the CCP of the various nodes may send messages to communicate between the nodes using Ethernet, ATM, or some other message based network.

The different nodes of such a network may have different resources that may be accessed by all the nodes. Such resources may include resources to support computer telephony applications, such as interactive voice response systems, credit card processing systems, inbound and outbound call centers, voice recognizer systems, voice conferencing systems or the like. Thus, resource connections may be initiated from any node and may involve resources between any two nodes connected in the network. For example, a first node might initiate a connection that utilizes another resource on a second node. Thus, a virtual connection may be set up between the first node and the second node to transmit data between the two nodes. The CCP of both nodes may be used to connect and disconnect resources between the nodes equipped in the virtual circuit network.

The different nodes may use networking devices, such as an ATM or Ethernet hub, to direct communications between the various nodes. Thus, the networking devices generally serve as network hubs for all nodes equipped in the system. To provide such multi-node computer telephony applications in the virtual circuit network, it is desirable to have mechanisms to dynamically allocate, de-allocate, and re-allocate the virtual circuit channels between the nodes to provide communications in a manner that would prevent channel allocation conflicts, and at the same time optimize the physical link bandwidth, and provide fault tolerance.

A preferred embodiment of the present invention also describes a method for allocating a channel on a virtual circuit network of a plurality of nodes, comprising receiving a connection request from an originating node to establish a connection between a first resource connection point (RCP) and a second RCP, determining a first node on the virtual circuit network associated with the first RCP and a second node associated with the second RCP. The received connection request is passed to a preferred one of the first and second nodes and forwarded to a first CCP associated with the preferred node to connect one of the RCPs associated with the preferred node with the other RCP. The RCP associated with the preferred node is connected to a channel allocated by the first CCP. The connection request is passed to the other one of the first and second nodes and forwarded to a second CCP associated with the other node to connect the other RCP to the RCP associated with the preferred node. The other RCP is connected to the allocated channel thereby completing the connection request.

A preferred embodiment of the present invention describes a method for de-allocating a channel on a virtual circuit network of a plurality of nodes, comprising receiving a disconnection request from an originating node to disconnect a connection between a first RCP and a second RCP, determining a first node on the virtual circuit network associated with the first RCP and a second node associated with the second RCP. The received disconnection request is passed to a preferred one of the first and second nodes and forwarded to a first CCP associated with the preferred node to disconnect one of the RCPs associated with the preferred node from the other RCP. The RCP associated with the preferred node is disconnected from the virtual circuit channel associated with the RCP. The disconnection request is passed to the other node of the first and second nodes and forwarded to a second CCP associated with the other node to disconnect the other RCP from the virtual circuit channel. The other RCP is disconnected from the virtual circuit channel, thereby completing the disconnection request.

A preferred embodiment of the present invention further describes a method for maintaining ATM link operational status between nodes, comprising broadcasting link status messages periodically over each link equipped in a node to a selected plurality of other nodes equipped in the ATM network, periodically retrieving the received link status messages at each node from the selected plurality of other nodes, determining and maintaining the in-service or out-of-service operational state of said links at each node. When a new connection is to be established between two nodes, the link status information is used to select an operational link between the two nodes during the channel allocation process.

Thus, it is an advantage of one aspect of the present invention to provide a virtual circuit allocation mechanism between different nodes in a virtual circuit network.

It is an advantage of another aspect of the present invention to provide a virtual circuit channel de-allocation mechanism between different nodes in a virtual circuit channel network.

It is an advantage of still another aspect of the present invention to provide a virtual circuit message protocol mechanism to coordinate opening and closing of virtual circuits between nodes, in order to eliminate pre-mature closing of a VC resulting in packet framing errors.

It is an advantage of a further aspect of the present invention to provide a link diagnostic and fault recovery mechanism to provide fault tolerance in a virtual circuit network.

It is an advantage of another aspect of the present invention to provide a mechanism to insure that multiple CCPs within a peer-to-peer multi-node ATM network may originate and terminate connections independently and simultaneously, without channel allocation conflicts and packet framing errors, and with optimum link bandwidth utilization and fault tolerance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
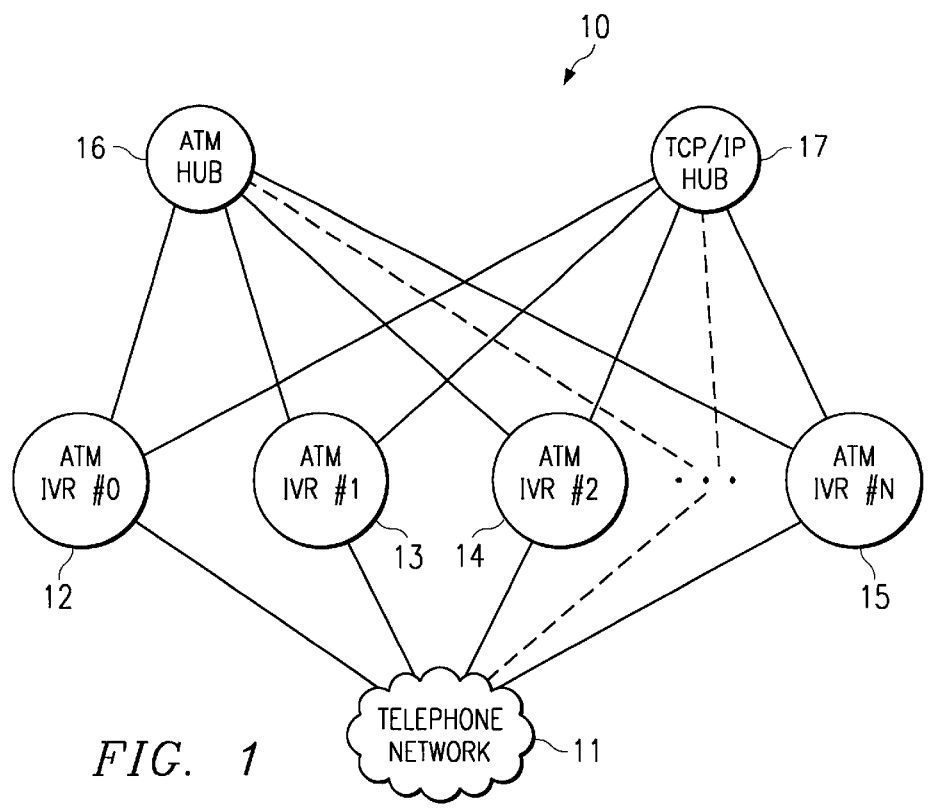
FIG. 1 represents a schematic diagram of a network incorporating the present invention.

FIG. 1 represents a schematic diagram of a network 10 incorporating the present invention. Nodes 12, 13, 14, and 15 represent nodes 0, 1, 2, . . . , N in network 10. These nodes are connected preferably to a network, such as a Public Switched Telephone Network (PSTN) 11. The connection between the nodes and the PSTN is typically a T1/E1 connection. Each node may have resources that may be used and accessed by other nodes. For example, node 12 may have an Asynchronous Transfer Mode (ATM) resource that may be used to provide computer telephony applications to the network. Similarly, node 13 may have another resource that may be used for a similar or different purpose. These resources may be associated with, for example, an Interactive Voice Response (IVR) application, a credit card processing application, inbound and outbound call centers, voice recognizer or voice conferencing applications, or the like. Thus, different application programs providing various resources may be running on different nodes of network 10. Such application programs may be used for different purposes. For example, node 12 may be executing an application program that provides a particular computer telephony service, whereas node 13 may be executing an application program that provides a different telephony service. In the preferred embodiment, an ATM hub or switch 16 is provided to facilitate communications between the various nodes of network 10 using asynchronous transfer mode communication. Similarly, a TCP/IP hub 17 may be provided to facilitate communication between the various nodes of network 10 using TCP/IP communications. Although, ATM hub 16 and TCP/IP hub 17 have been shown as separate hubs, they could be the same hub. Furthermore, ATM hub 16 is capable of transferring TCP/IP messages. Specifically, administrative and/or connection oriented messages may be transferred between the nodes using TCP/IP messaging system. However, administrative and/or connection oriented messaging may be transferred between nodes using any messaging based network that would provide peer-to-peer communications between nodes, without departing from the scope of the present invention.

The ATM hub 16 serves as the network hub for all nodes equipped in the system. The ATM hub may be configured with a network of Permanent Virtual Circuits (PVCs) to permit a non-blocking architecture between resources on nodes 12, 13, 14, and 15. In the preferred embodiment, ATM switch 16 is configured with a meshed network of PVCs. However, Switched Virtual Circuits (SVCs) may also be used without departing from the scope of the present invention. Preferably, PVCs are also configured to provide messaging between the nodes.

In the preferred embodiment, a single ATM physical link is equipped on each node. However, more then one ATM physical link may be provided on each node, if desired. For example, some applications may require a higher degree of fault tolerance. These applications may require all nodes to be equipped with two links for this purpose. Alternatively, only some nodes may be equipped with more than one link, if desired. When both nodes involved in a connection are equipped with two links, load sharing may be performed between the links.

Preferably, each link is capable of supporting 256 full duplex 64 kbs Pulse Code Modulation (PCM) channels. However, different ATM Network Interfaces may be configured differently depending on the requirements of a particular network and the physical link data rate. For example, some ATM Network Interfaces may support more than 2048 full duplex channels, while others may support less than 256 full duplex channels. Moreover, some channels may be duplex, while others may be unidirectional. Although, in the preferred embodiment, a 64 kbs channel is used, the invention is not so limited and channels of different rates may be used without departing from the spirit of the present invention. Furthermore, the different channels of a link on a node may be routed to a single remote node, or distributed between the multiple nodes of the virtual circuit network. Thus, in the preferred embodiment described above, all channels of one node may be routed to the same remote node.

Each node connected to the ATM network may be assigned a unique node number. For example, an N node network may use node numbers 0 to (N−1). Thus, an 8-node system may use node numbers 0 to 7. However, the nodes may be assigned any number without departing from the spirit of the present invention. Furthermore, Resource Connection Points (RCP) on each node may also be assigned RCP identifiers (ID). Preferably, the RCP ID range for the telephone lines connected from a telecommunications network to each node of FIG. 1 is 0 to (X−1), where X is the number of telephone line RCP ID's associated with each node. Each node within the network may be assigned a block of sequentially numbered RCP ID's for the different resources that reside at that node. Preferably, the RCP ID assignments on one node do not overlap RCP ID assignments on other nodes. Alternatively, each node within the network may be assigned random RCP IDs. Moreover, if desired, the RCP ID assignments on one node may overlap with RCP ID assignments on other nodes. In the latter embodiment, resources on different nodes may be identified by using the node number along with the RCP ID.

Each channel to a particular remote node may be assigned a unique remote node channel number. Thus, in the preferred embodiment links capable of a maximum of Y channels, the channel numbers assigned to a particular remote node may be in the range of 0 to (Y−1). The range of channel numbers may vary depending on the number of channels provided by the ATM network interface. For example, if an interface is capable of 2048 channels, such as might be available on a ATM 155.52 MHz link, then the remote node channel numbers assigned to a particular remote node may be in the range of 0 to 2047. Since VCs are typically configured for a specific number of virtual circuit channels to meet end-to-end delay requirements of a system, each remote channel number 0 to (Y−1) maps directly to a virtual circuit channel number within a particular virtual circuit. For example, if a link capable of 256 channels is configured for 16 channels per VC, then remote node channels 0–15 would map to remote node VC 0 and VC channels 0–15 respectively, channels 16–31 would map to remote node VC 1 and VC channels 0–15, and so on. Therefor, the link number, the remote node number, and the remote node channel number combine to identify a particular VC channel to a remote node.

Each remote node VC is assigned a unique VPI/VCI at the ATM link level. In the preferred embodiment, the remote node channel translations to VC VPI/VCI identifiers and VC channel assignments are statically defined by system configurations. However, these translations and assignments may be performed dynamically without departing from the spirit of this invention. In the preferred embodiment the sum of all VC channels in active VCs on a particular link to all remote nodes must not exceed the channel and bandwidth capacity of the link.

A node in the network is generally a processor-based system, such as a personal computer. Each node in the network may have a Connection Control Processor (CCP). The CCP is preferably a combination of hardware and software sub-process mechanisms, which provide all initialization and operational functions necessary to manage resources in the node. In the preferred embodiment, one CCP sub-process is called a Resource Handler (RH). For example, if a proprietary device, such as a card, is plugged into the node, which may be a computer, a CCP-RH will initialize the proprietary device and also provide an interface for controlling the device resources, such as allocating, connecting, disconnecting, de-allocating, or other resource related function. Furthermore, the CCPs on different nodes may communicate with each other, if necessary. When a CCP receives a resource request from a node, the CCP determines the routes and processes desirable to complete the request. It then sends messages to the nodes involved in the request to either connect, disconnect, or perform some other connection or administrative function.

Figure 2:
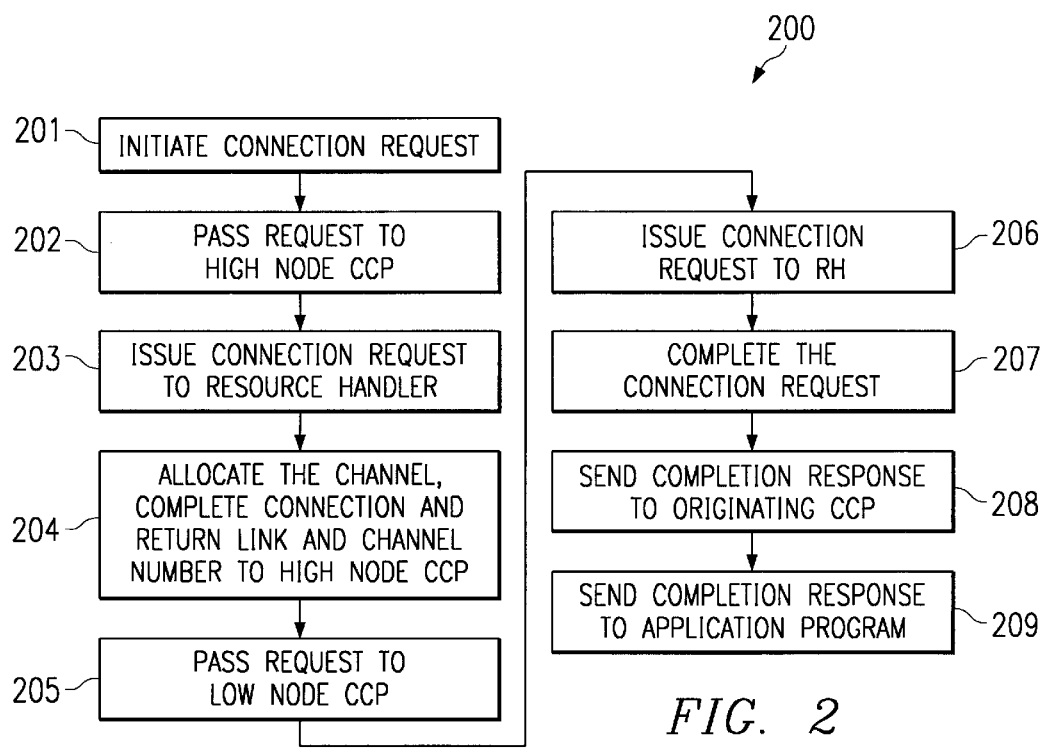
FIG. 2 shows a flow chart for virtual circuit channel allocation in a preferred embodiment of the present invention.

FIG. 2 shows the steps that may be followed in VC channel allocation in a preferred embodiment of the present invention. In step 201, an application program running on any node may initiate connection requests by issuing the appropriate Application Programming Interface (API) call to its resident or remote node CCP. The receiving node CCP evaluates the RCPs involved in the API connection request to determine which nodes the RCPs reside on. Note that when the application program issues the API call to its resident CCP, the receiving and originating nodes are the same. A RCP is preferably a resource connection controlled by the RH of the associated node. In step 202, the CCP associated with the receiving node passes the request to the CCP associated with the high node. The high node is preferably the highest node number in the network associated with one of the RCPs. In the allocation mechanism of the preferred embodiment, channels on the node identified as the highest number node in network 10 are allocated first. If the originating CCP is also the high node CCP, a message may be placed on an internal queue for resident CCP processing. In step 203, the high node CCP processes the message by issuing a connection request to the RH of the high node, with the remote low node defined, and the VC channel and link number set, in a preferred embodiment, to minus 1. The VC channel and link number may be set to any predefined valid number, or any valid number generated based on predefined criteria.

The RH recognizes that the link number is not defined. In the case where the node is equipped with a single link, the RH defaults to this link. If both the high node and the low node are equipped with more than a single link, the RH uses a load sharing method to identify and select the appropriate link. Although in the preferred embodiment a load sharing method is used to select the appropriate link, the invention is not so limited and links may be selected based on other criteria. For example, in an alternative embodiment the first link may be the link that is always selected. In another embodiment, links may be selected in sequence, i.e. if a link was selected the last time around, then that link is not selected this time. In another embodiment, two or more links may be selected to carry redundant information, where if one link fails, end-to-end connectivity can be quickly restored by both nodes switching from the channel on the faulty link to the channel on the operational link.

The RH of the high node also recognizes that the channel number is not defined. In a preferred embodiment, it searches the channel allocation table of the selected link for an available channel to the low node. In the preferred embodiment, channels are searched beginning with the first channel, say channel 0, incrementing sequentially, and ending with the last channel, say channel 255. This insures that channel allocations are done sequentially and that channel allocation between nodes is concentrated towards the lower channel numbers. In alternative embodiments, different channel search and allocation mechanisms may be used, such as binary search, or selecting a spare channel in an active virtual circuit, without departing from the spirit of the invention.

Therefore, in step 204, the RH allocates the channel, translates the channel to a VC and VC channel number as described above, completes the connection, and returns the link and channel number within the API message structure to the high node CCP. In step 205, the high node CCP passes the connection request, with the link and channel number assigned by the high node, to the low node CCP. In step 206, the low node CCP processes the message by issuing a connection request to the RH of the low node, specifying the remote node, and the link and channel to use. In step 207, the RH verifies that the specified link and channel is available to the high node, translates the channel to the VC and VC channel number, and completes the connection request. In step 208, the low node CCP then sends a completion response to the originating CCP. On receiving the completion response from the low node CCP, the originating CCP sends a completion response to the application program in step 209.

For example, suppose the application desires to make a connection between RCP 1 and RCP 1001. Then the application initiates a connection request to its resident CCP to connect RCP 1 and RCP 1001. The CCP evaluates the CPs to determine which nodes the RCPs reside on. Suppose that RCP 1 resides on node 0 and RCP 1001 resides on node 1. Thus, node 1 would be the high node and node 0 would be the low node. If node 1 is the originating node, then the CCP places a command to connect RCP 1001 to remote RCP 1 on a local message queue. If node 1 is a remote node then the originating CCP sends a request, preferably via TCP/IP, to the high node CCP, which in this example would be the CCP associated with node 1, to connect RCP 1001 to remote RCP 1.

The high node (node 1) CCP issues a request to the RH to connect RCP 1001 to remote RCP 1. The RH allocates a channel on the selected link, translates the channel to a VC and a VC channel number available to the low node, and then connects the allocated channel to RCP 1001. Node 1 CCP then sends a message to node 0 CCP to connect RCP 1 to RCP 1001. This message contains the virtual circuit channel information for node 0. Node 0 CCP issues a request to the RH to make the channel connection. The RH verifies the specified link and channel is available to the high node, translates the channel to a VC and a VC channel number, and then connects the allocated channel to RCP 1. Node 0 CCP sends a completion response to the originating CCP, which then sends the completion response to the application program. Thus, the requests to make the connections are preferably sent using TCP/IP messages, whereas the connection itself by the RH is preferably done at the ATM level.

Figures 3, 5:
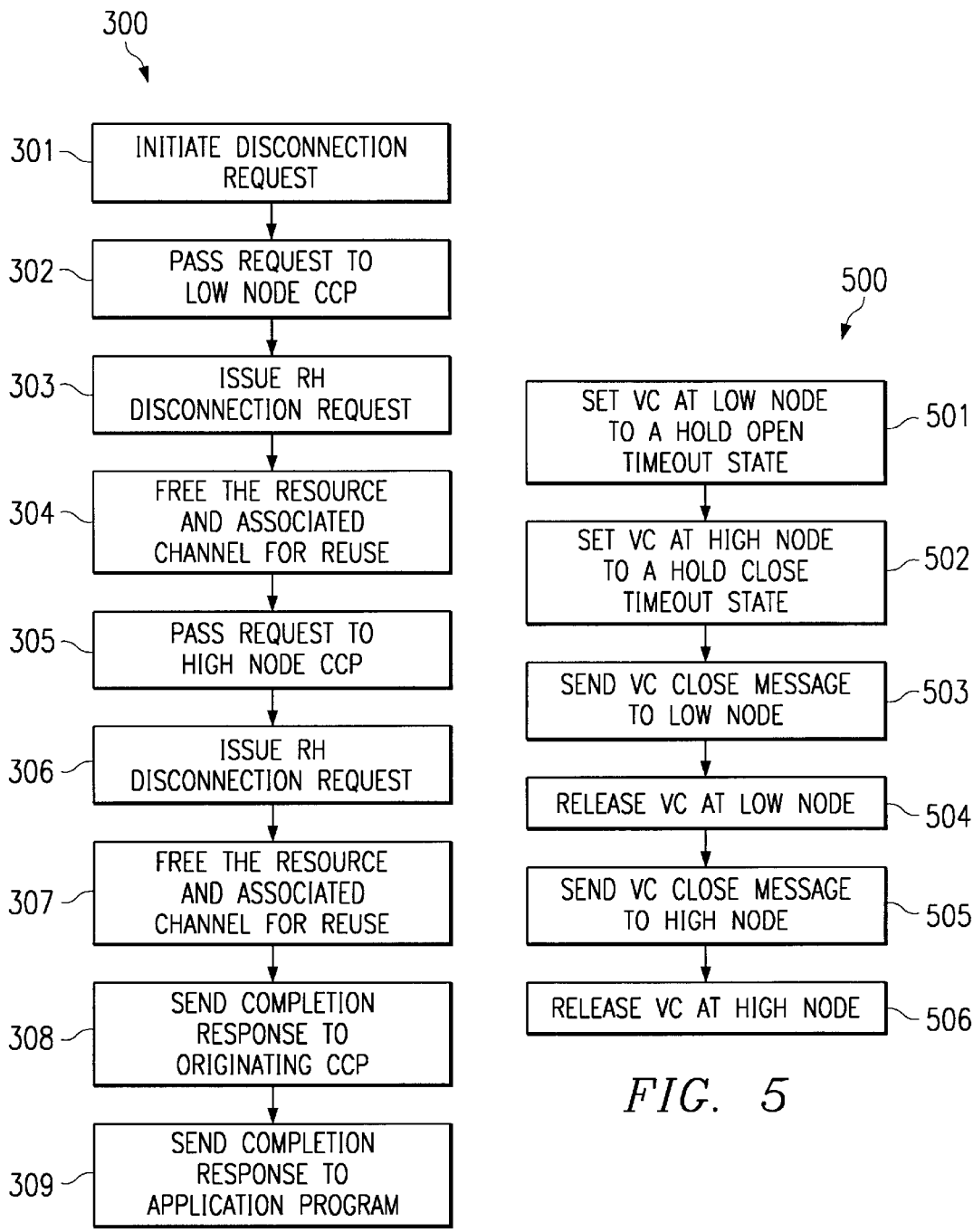
FIG. 3 shows a flow chart for virtual circuit channel de-allocation in a preferred embodiment of the present invention.
FIG. 5 shows a flow chart for a preferred embodiment virtual circuit close message protocol.

FIG. 3 shows the steps that may be followed in VC channel de-allocation in a preferred embodiment of the present invention. In step 301, an application program running on any node may initiate a disconnection request by issuing the appropriate API call to the resident or remote node CCP. The receiving node CCP evaluates the CPs involved in the API disconnection request to determine which nodes the CPs reside on. Note that when the application program issues the API call to its resident CCP, the receiving and originating nodes are the same. In step 302, the CCP associated with the receiving node passes the request to the CCP associated with the low node. In the de-allocation mechanism of the preferred embodiment, channels on the node identified as the lowest number node in network 10 are de-allocated first. If the originating CCP is also the low node CCP, a message may be placed on a local message for resident CCP processing. In step 303, the low node CCP processes the message by issuing a disconnection request to the RH of the low node to free the RCP and associated channel for reuse. The low node may also determine if the de-allocated channel is the last channel on the VC. If the de-allocated channel was the last channel active in the VC, then the low node may initiate a VC hold opened message protocol between the high and low nodes to prevent race conditions, as discussed herein below. In step 304, the RH frees the RCP and the associated channel, for subsequent reuse, if desired.

In step 305, the low node CCP passes the disconnection request to the high node CCP. In step 306, the high node CCP processes the message by issuing a disconnection request to the local RH to free the RCP and associated channel for reuse. The RH of the high node CCP may also execute RH logic to determine whether Dynamic Channel Re-allocation (DCR) is desirable. The RH logic and DCR are discussed in detail herein below. In step 307, the RH frees the RCP and associated channel for reuse and completes the disconnection request. The high node may also determine if the de-allocated channel is the last channel on the VC. If the de-allocated channel is the last channel on the VC, then the high node may initiate a VC hold closed message protocol between the high and low nods to prevent race conditions, as discussed herein below. In step 308, the high node CCP sends a completion response to the originating CCP. On receiving the completion response from the high node CCP, the originating CCP sends a completion response to the application program in step 309.

For example, suppose the application desires to de-allocate the connection between node 0 and node 1. The application initiates a disconnection request with its resident CCP to disconnect RCP 1 from RCP 1001. The CCP evaluates the CPs and determines that RCP 1 resides on node 0 and RCP 1001 resides on node 1. If node 0 (the low node) is the originating node, then the CCP places a command to disconnect RCP 1 from remote RCP 1001 on a local message queue. If node 0 is a remote node then the originating CCP sends a request, preferably via TCP/IP, to the low node CCP, which in this example would be the CCP associated with node 0, to disconnect RCP 1 from remote RCP 1001.

The low node (node 0) CCP issues a request to the RH to disconnect RCP 1 (which resides on node 0) from the channel. RH disconnects the RCP 1 from the channel and frees the channel for reuse. Node 0 CCP then sends a message to node 1 CCP to disconnect RCP 1001 from RCP 1. Node 1 CCP issues a request to the RH to disconnect RCP 1001 from the channel. The RH disconnects RCP 1001 from the channel and frees the channel for reuse. Node 1 CCP then sends a completion response to the originating CCP, which then sends the completion response to the application program to inform it that the disconnection has been completed.

The channel allocation/de-allocation process of the preferred embodiment insures that, if desired, multiple CCPs within the network may originate connections between the same nodes without channel allocation conflicts. For this purpose, in the preferred embodiment, when processing a connect request, channels are first allocated on the high node and then the low node. On the other hand, when processing a disconnect request, channels are first de-allocated on the low node and then the high node. In the preferred embodiment, a channel may not be re-allocated on the high node until the second part of a disconnect request (de-allocation of the channel at the high node) is completed on the high node. This ensures that the same channel is not allocated twice and that a channel is not allocated while a de-allocation request for the same channel is in progress.

During the normal allocation/de-allocation process as described above, VCs are opened and closed dynamically as needed to provide connectivity between nodes. When a VC is opened the number of channels, such as PCM channels, required to be carried is specified. Once a VC is opened, the VC immediately begins transmitting periodically null packets for the specified number of channels. As individual channels are opened in a VC, null packets begin to fill with data, such as PCM data. As individual channels are deactivated or closed in a VC, the packets again begin to fill will nulls. Since null packets represent unutilized bandwidth, a VC is most bandwidth efficient when all channels are active or allocated. A VC becomes less bandwidth efficient as channels are de-activated or de-allocated. When the last channel in a VC is deactivated, the VC is preferably closed in order to release the bandwidth used by or allocated to the VC.

In the preferred embodiment, a Dynamic Channel Re-allocation (DCR) mechanism is used to make the most efficient use of the bandwidth between nodes by combining channels from multiple VCs into one VC, so that VCs that are not needed may be closed. For example, if two twelve channel VCs are open, they effectively use bandwidth equivalent to 24 channels. However, if one VC had 11 active channels and the other VC had 1 active channel, then bandwidth equivalent to only 12 of the 24 available channels is being used. Therefore, using DCR the 1 active channel of the second VC could be remapped into the first VC. The unused or second VC may then be closed and thus bandwidth equivalent to 12 channels may be made available for other resources.

Figure 4:
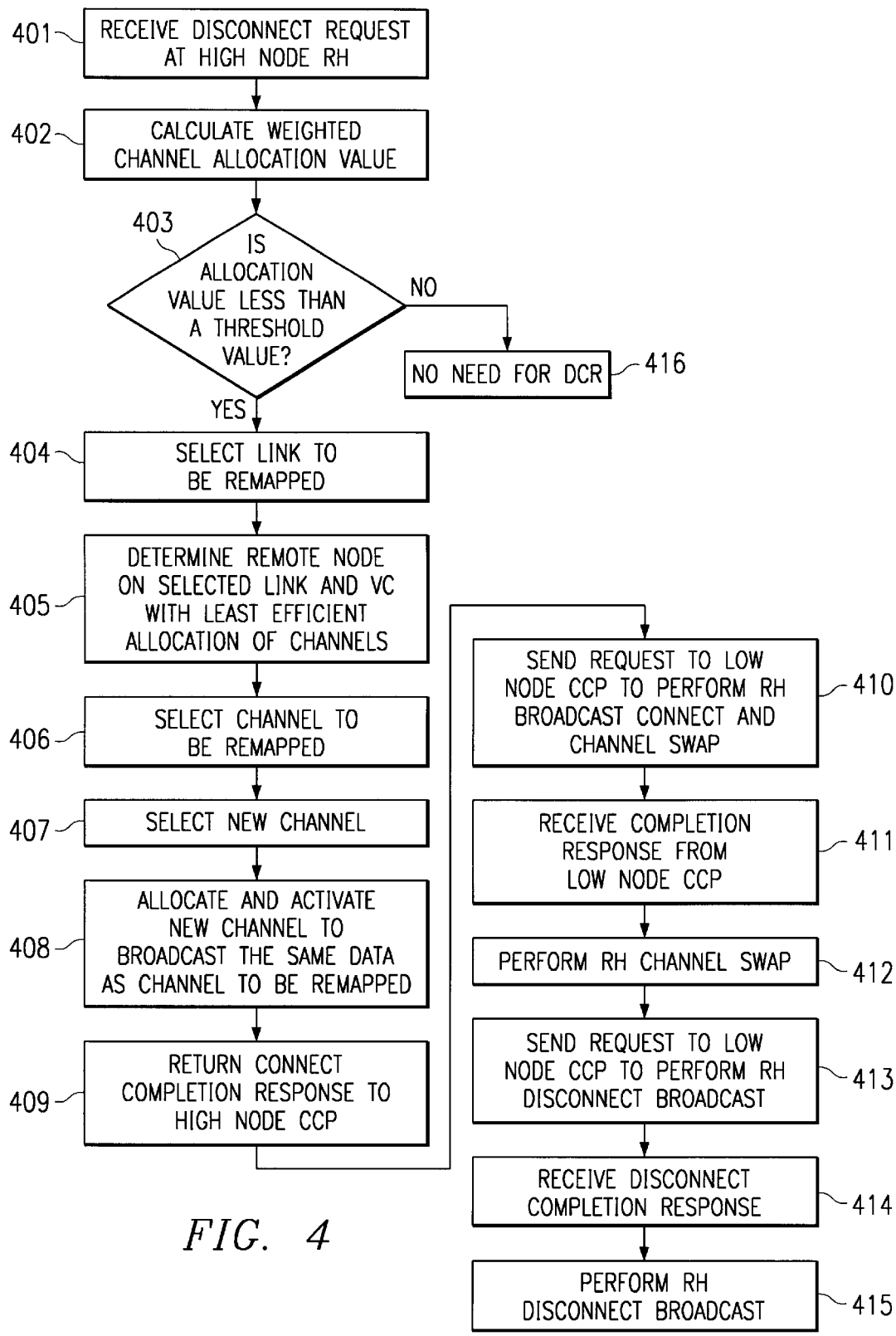
FIG. 4 shows a flow chart for virtual circuit channel re-allocation in a preferred embodiment of the present invention.

FIG. 4 shows the steps that may be followed in virtual circuit channel reallocation in a preferred embodiment of the present invention. The DCR process is initiated by the RH of the high node. Each time the high node RH executes a disconnect or de-allocation request, RH logic is executed by the RH to determine if channel re-allocation or re-mapping is desirable. In the preferred embodiment, the DCR logic is a RH sub-process of the CCP. In an alternative embodiment, the DCR process may be located elsewhere. Furthermore, the DCR process could be performed using hardware or software.

Thus, once the RH of the high node executes a disconnect or de-allocation request, as shown in step 401, the RH calculates a weighted channel allocation value of equipped and operational links on the node (step 402). The channel allocation value is determined by summing all of the inactive channels associated with all active VCs on each link, and then dividing this sum by the total number of channels available on the link. In the preferred embodiment as discussed above, the number of channels available on the link is 256. In step 403, the allocation value of the link with the least efficient allocation of channels is compared to a system configured DCR threshold value in the range of 1% to 99%. If the allocation value is less than the threshold value, then in step 404, the least efficient link that meets or exceeds the DCR threshold value is selected for re-mapping. Although DCR is used in the preferred embodiment, it may be disabled, for example, by setting the DCR threshold value to 0.

The RH in step 405 then determines which remote node, on the selected least efficient link, has the least efficient allocation of channels. The calculation is performed for each remote note by summing all of the inactive channels of all active VCs associated with each remote node, and then dividing this sum by the total number of channels available on the selected least efficient link. Preferably, these calculations are performed for remote nodes with a lower number than the high node. The remote node with the highest ratio of inactive channels is selected for re-mapping. Once the remote node is identified, in step 406 the RH then searches the specified remote node channel allocation table for an active channel in an active VC that can be remapped to a channel of another active VC. In the preferred embodiment, re-mapping is done from the highest numbered active channel located in the highest number active VC, to the lowest numbered inactive channel located in the lowest numbered active VC. In an alternative embodiment, channel re-mapping on the identified remote node may be done from a VC identified as being the least efficiently utilized, to a more efficiently utilized VC that has a spare channel available. In another alternative embodiment, if two or more links are equipped between two nodes, the DCR process may select a channel on one link to be re-mapped to a new channel on another link. Other methods of aggregating channels into fewer VCs may be utilized without departing from the spirit of this invention. If RH logic determines such channels exists for re-mapping, then in step 408 the new channel is allocated to simultaneously carry the data that was carried by the channel to be remapped. In step 409, the RH then returns a connection complete response to the high node CCP indicating that a dynamic channel re-allocation process has been triggered. The response message includes the RCPs link, and channel information desired for the CCP to complete the DCR process between the high and low nodes.

The high node CCP starts a background RH sub-process to perform the DCR functions while normal connect and disconnect processing continues. In step 410, the high node CCP sends a request to the low node CCP to perform an RH broadcast connect and channel swap using the new channel allocated in the previous step. Swapping channels on a specified node means that the channel to be re-mapped on the selected node is disconnected from the selected node's RCP, and then the same RCP on the same node is re-connected to the new channel. Once the process is complete on the low node, in step 411 the low node CCP sends a completion response to the high node CCP. In step 412, the high node executes an RH channel swap on its node. The specified RCPs on the high node and the low node are now connected full duplex using the new channel. However, both the high node and low node continue to broadcast the RCP data from the respective nodes over the mapped out channel. In step 413, the high node sends a request to the low node CCP to execute a RH disconnect broadcast of the mapped out channel that frees the mapped out channel. Once the high node gets a disconnect completed response from the low node in step 414, the high node executes a RH disconnect broadcast of the mapped out channel in step 415 that frees the mapped out channel, completing the DCR process. In this manner, a desired active channel may be remapped to a inactive channel located in another VC that is active, in order to aggregate channels into fewer active VCs. If the mapped out channel was the last active channel in the VC, the VC may be closed. If the mapped out channel being de-allocated on either the high node or low node, is the last channel in the VC, then DCR process on either the high node or low node may initiate a VC hold closed and a VC hold open protocol respectively, as discussed herein below. The DCR process may be terminated at any time before completion by an application program on any node initiating a CCP API request to disconnect the CPs involved in the DCR process.

Starting a dynamic channel re-allocation process or a new connection request on the high node, however, may cause a race condition when multiple disconnect requests are being processed simultaneously on the low node. Normally when the last channel in a VC is deactivated on each node during a disconnect or de-allocation process, the VC is closed. Race conditions may occur when the low node deactivates one or more channels in a VC resulting in closing of the VC, while the high node is simultaneously activating a channel in the same VC. When this occurs, it appears to the high node that there are one or more active channels in the active VC and assigns an additional channel for the new connection process, while it appears to the low node that there are no active channels on the VC and closes the VC. In the absence of a network protocol, such as a VC close message protocol between the nodes, the new connection request originating at the high node would complete on the low node by the low node reopening the VC and activating the requested channel. Thus, the VC may be closed and reopened at the low node end, while at the high node end the same VC remains open. Thus, both the high node and the low node have one active channel in the VC. However, when a VC is closed and re-opened on one end of a connection (say, the low node), while the VC remained open on the other end (say, the high node), ATM sequence, over-run and under-run packet framing errors may occur on the VC that remained open.

To prevent these packet framing errors from occurring, in the preferred embodiment, a message protocol, such as a VC close message protocol, may be implemented between the nodes over the TCP/IP network to perform handshaking between the low and high nodes to coordinate closing of VCs. In the preferred embodiment, the protocol is triggered when the last channel is closed or de-allocated on a low node VC, say for example due to a de-allocation request. According to the protocol, in FIG. 5 step 501 the low node VC remains opened and is set to a predetermined hold open timeout state, in which the low node waits for a VC close message from the high node. New connections can be established on a VC that is in the hold open state. If a new connection is established on a VC that is in the hold open state, the hold open timeout state is canceled. Preferably, the hold open timeout state is three seconds, however, different hold open timeout states may be used without departing from the spirit of the invention. Once the high node completes the disconnect or de-allocation process and closes the last channel in the same VC, in step 502 the high node closes the VC, sets the VC to a predetermined hold close timeout state and in step 503 sends a VC close message to the low node. New connections cannot be established on a VC that is in a hold closed timeout state. In the preferred embodiment, the hold close timeout state is six seconds, however, different hold close timeout states may be used without departing from the spirit of the invention. When the low node receives the VC close message from the high node, it may cancel the VC hold open timeout state, close the VC, and release the VC for reuse in step 504. In step 505, the low node may send a VC close message back to the high node. When the high node receives the VC close message from the low node, it may cancel the VC hold close timeout state, and release the VC for reuse in step 506. In the preferred embodiment, the hold open timeout state of 3 seconds and the hold close timeout state of 6 seconds ensure that timeouts do not occur under the least efficient case CCP load conditions. In alternative embodiments, different values may be used for the hold open and hold close timeout state. For example, in alternative embodiments, the hold open timeout state may be between 1 and 5 seconds, and more preferably between 2 and 4. The hold close timeout state may be between 4 and 8 seconds, and more preferably between 5 and 7 seconds. Moreover, the hold open timeout state may be greater than the hold close timeout state or the hold close timeout state may be greater than the hold open timeout state.

Thus, when the simultaneous connect/disconnect race condition stated herein above occurs, the low node VC is in a hold open timeout state. The new connection request from the high node is processed on the low node before the low node VC state timeout occurs. On receiving the connection request from the high node, the low node may cancel the low node VC hold open timeout state, remain open, and complete the new channel activation request as described with reference to FIG. 1. If the high node fails to receive the VC close message, the VC hold closed timeout occurs resulting in the VC being released for reuse. If the low node fails to receive the VC close message from the high node, the VC hold opened timeout occurs, which may result in the VC remaining opened, or being closed and released for reuse. If either node receives a VC close message from the other node, while the specified VC is in the VC hold opened or hold closed timeout state, the receiving node's VC may be closed and released for reuse. System faults may be reported when a VC timeout occurs, or a VC close message is received on a VC with active channels.

As discussed above, nodes within a virtual switch network, such as an ATM network, may be equipped with more than one link. The number of links to be equipped on any node depends on the fault tolerance and traffic requirements of the network. Furthermore, all nodes within such an ATM network do not need to have the same number of links. For example, some applications may concentrate a heavier traffic load between only a few nodes within the network. In such a case, these high traffic nodes may be the only nodes equipped with more than one link. In addition, there may be applications that are more critical than other applications and it might be desirable to provide more than one link to nodes that utilize such critical applications.

Furthermore, hardware, software and configuration errors may cause one or more links between nodes in the VC network, such as an ATM network, to fail. Therefore, link status messages are transmitted between nodes to provide a mechanism to detect link failures in the network. Thus, each node may be provided with a diagnostic table containing link status information received from other nodes in the network. When the connection control process (CCP) is started on a node, a CCP RH sub-process begins to broadcast link status messages about the links equipped on the node, preferably every 500 milliseconds, preferably to all remote nodes configured in the network. The link status messages are broadcast using AAL5 data packets, to all other nodes over the ATM network preferably on static point-to-multipoint unidirectional VCs that are opened during RH initialization. However, a meshed network of bi-directional VCs may be used to broadcast link status messages between all nodes, without departing from the spirit of this invention. Also during RH initialization, each peer-to-peer node in the network opens the associated remote node VCs to receive these status messages from the other peer nodes. Therefore, if for some reason, the network fails between any two nodes, the link status messages between these two nodes may fail to arrive in one or both directions. Furthermore, in the preferred embodiment, every 1000 ms the RH also retrieves link status messages about all remote nodes in the network from a message buffer. This transmit to receive ratio of 2-to-1 of the preferred embodiment is maintained so that all nodes retrieve at least one status message from the receive buffer each 1000 ms from all other nodes under the least efficient case load conditions. However, if desired other transmit to receive ratios may be established depending on the load on the network and the applications being used. The CCP performs similar status messaging between nodes to verify that the TCP/IP network is working peer-to-peer between CCP processes.

If a node does not receive at least one link status message from a particular remote node link within the predetermined period of, say 1000 milliseconds, the local receiving node marks the corresponding remote node's link as out-of-service (OOS) in its diagnostic table. Furthermore, in the preferred embodiment, if there are one or more links equipped between the local and remote node, and the local node fails to retrieve link status messages from all links to a remote node, then the remote node's network is marked OOS in the local node's link status table. Subsequent requests by the application program made to the CCP requesting connections to the OOS remote node network, may be rejected. In the alternative, the CCP may retrieve the remote node link status from RH, before issuing a RH connection request to the remote node, in order to determine if the remote node link or network is back in service. When the local node begins to receive link status message from one or more remote node links currently marked as OOS, the local node RH logic clears the remote node link fault and restores CCP connection request processing to the remote node using the links restored to service. Preferably, all link status message transmitted from a node contains the status of all links equipped on the particular node, e.g. whether a particular link is operational or not.

RH also monitors status of links equipped on its own local node, and may place its own links and/or network out of service based on certain criteria obtained from the ATM network interface card. When RH identifies a fault on its own link, and places this link OOS in its local link status table, then all CCP connection requests to RH, requesting a connection to any remote node specifying the OOS link, are rejected by RH.

Thus, when an allocation or connection request is initiated on the high node, the high node may review the link status diagnostic table to determine which local and/or remote links are operational. If the high node is equipped with only one link, and this link is operational, and the corresponding link on the low node is also operational, then the connection is completed on this link. For example, in FIG. 6 if node 63 desires to establish a connection with node 62, then the connection may be completed on the link from node 63 to ATM HUB 66, and from ATM HUB 66 to node 62. If the high node is equipped with two links, and only one link is operational, and the corresponding link on the low node is also equipped and operational, then the connection is completed on this link. Thus, in FIG. 6, if node 64 desires to establish a connection with node 63, then it may do so through HUB 66 provided that the corresponding link from HUB 66 to node 63 is also operational. Note that this connection may be established even if the link from node 64 to HUB 68 is non-operational.

If both the high node and low node are equipped with two links, and both links on the high node are operational, but only one of two links on the low node is operational, then the connection is completed on the link corresponding to the low node link that is operational. Thus, if node 64 desires to establish a connection with node 62, which also has two links, only one of which (say the link to HUB 68) is operational, then the connection between node 64 and node 62 is established through HUB 68. If both the high node and low node are equipped with two links, and both links are operational on both nodes, then the high node may use a load sharing mechanism to select the link and complete the connection. In the alternative, if both links are operational on both nodes, the high node may always select a particular link. In an alternative method, two or more links between two nodes may be used to carry redundant data in order to provide a primary connection channel and a secondary standby connection channel, where if the primary link fails, the two nodes may quickly connect to the redundant channel on the secondary link.

Figure 6:
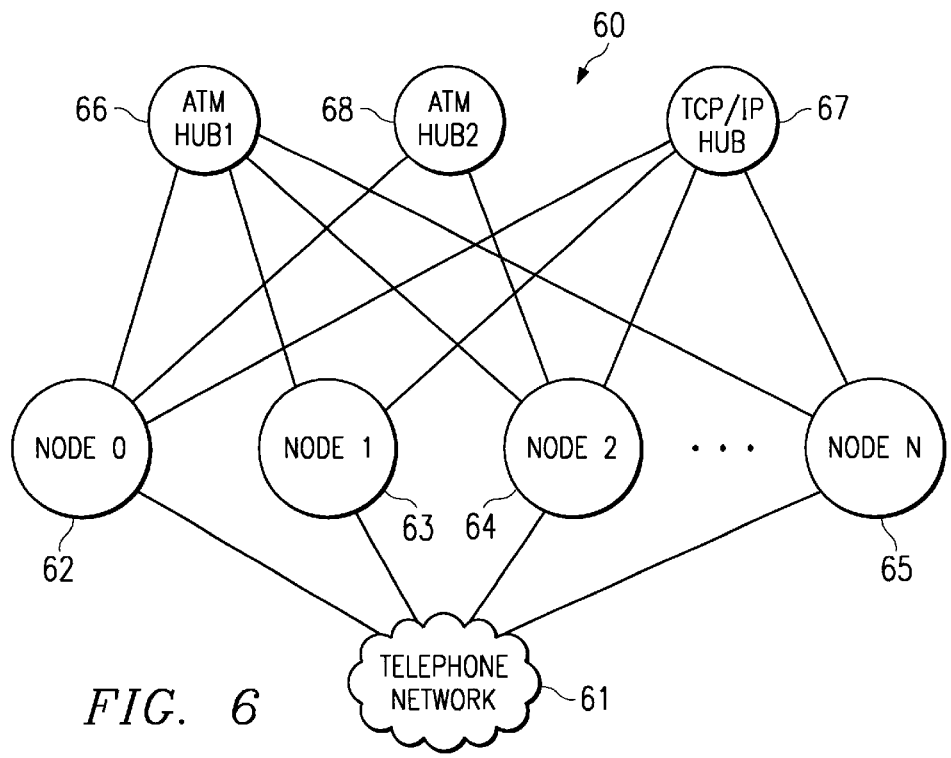
FIG. 6 represents a schematic diagram of another network incorporating the present invention.
Figure 7:
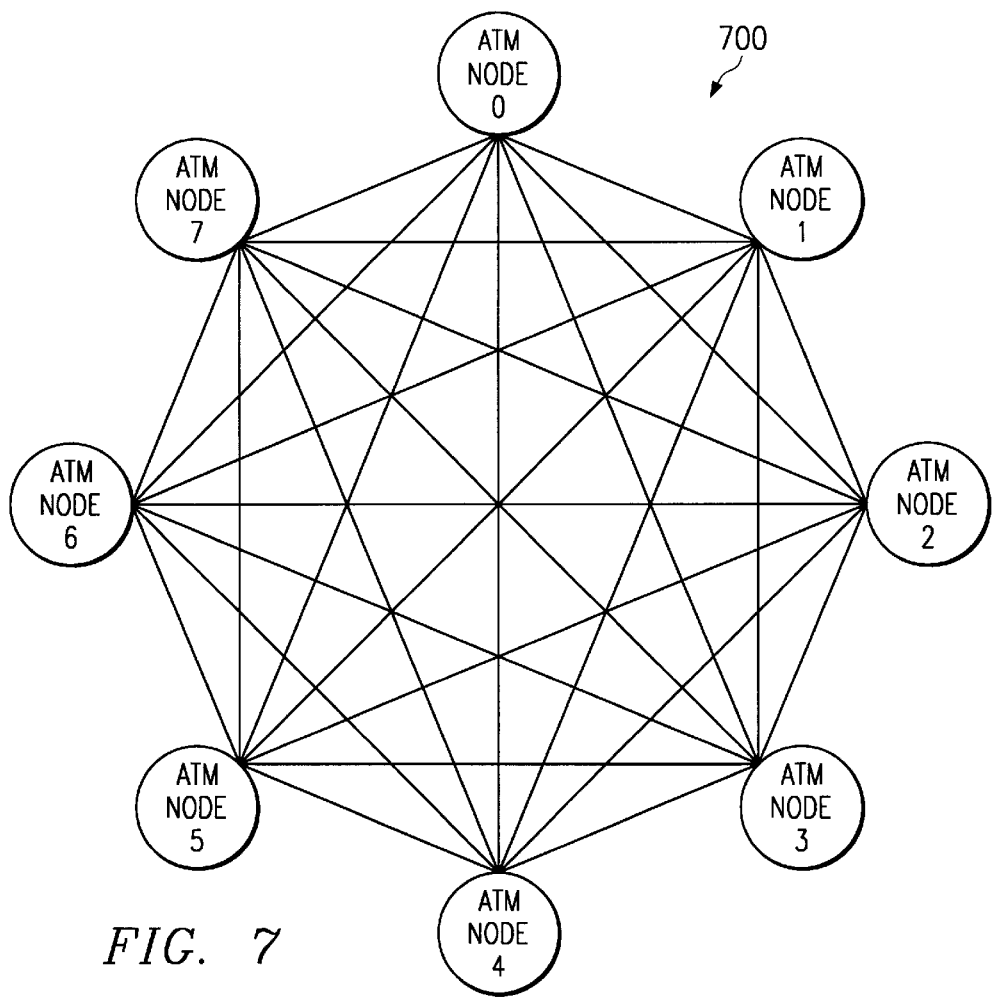
FIG. 7 represents a schematic diagram of a meshed network of virtual circuits.

When there are no operational links on either the high node or the low node, the connection request made by the CCP is rejected by RH of the high node. The CCP may then report to the application program that the node's network is OOS. The application may then clear all connections established on the node's associated links. The RH may also reject the connection request made by the CCP when all operational links on either the high node or the low node reach a predefined capacity, say their maximum capacity. In FIG. 6, although the links from node 62 (and node 64) are connected to different HUBS 66 and 68, the two links may be connected to the same HUB.

The CCP may periodically poll the RH for link status information to detect when one link on a node equipped with more than one link is OOS. When a link fault is detected, the CCP may trigger a mechanism to disconnect all connections established on the faulty link, and reestablish the disconnected connections on the operational link.

In a preferred embodiment of this invention, link status messages are sent between nodes over the ATM network in order to isolate ATM network faults between nodes, using uniquely formatted AAL5 data packets. However, an alternative embodiment may use TCP/IP on an ATM local area network (LAN) emulation mechanism.

Thus, the present invention provides fault tolerance by equipping some or all nodes with more than one link. If a node has more than one link then the network may have more than one hub or switch as shown in FIG. 6. However, the additional links may be connected to the same hub as the original link. The nodes with more than one link may be connected to the different hubs using the corresponding links. Furthermore, when only some nodes are equipped with more than one link, the additional hub or switch may have only those nodes connected to it. Moreover, since the nodes may be equipped with any number of links, the number of nodes connected to the different hubs or switches may be different. If desired, the different physical links of a node may be connected to the hubs in a predefined order. Moreover, if desired, certain nodes may be connected to one hub and certain other nodes may be connected to a different hub. For example, for certain critical applications residing on different nodes, the different nodes may be divided up equally to be connected to certain hubs and switches, i.e. some of the nodes may be connected to a particular hub while others connected to a different hub, thus ensuring that if one of the hubs becomes non-operational, the network is still operational.

Moreover, although the present invention has been described with respect to a high node and a low node, the roles of the two nodes may be reversed, i.e. the high node may be substituted for a low node and a low node may be substituted for a high node without departing from the spirit of the present invention. Furthermore, even though the term high node and low node have been used preferably to denote a higher numbered node and a lower number node, respectively, the invention is not so limited. For example, the high node may be a node with a higher priority and the low node may be a node with a lower priority. In such an embodiment, priority may be determined based on a predetermined criteria or based on other criteria such as network traffic. Moreover, the teachings of the present invention may be used in other types of networks, such as a frame relay network or any other network that uses packets of fixed or variable size.

It should be noted that the VC close message protocol discussed above for preventing race conditions is preferably performed using a meshed network of point-to-point bi-directional VCs. These messaging VCs are preferably a separate and distinct set of VCs, from those used for connection between RCPs and those used for point to multi-point link status messaging. However, the VC close messaging and link status messaging may also be performed or complimented using TCP/IP or other peer-to-peer messaging mechanism, without departing from the spirit of this invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for allocating a channel on a virtual circuit network of a plurality of nodes, comprising:
   receiving a connection request on a receiving node, from an originating node, to establish a connection between a first resource connection point and a second resource connection point;
   determining a first node associated with said first resource connection point and a second node associated with said second resource connection point;
   passing said connection request to a preferred one of said first and second nodes;
   allocating the channel by said preferred one of said first and second nodes for connecting said first and second resource connection points, wherein said allocating the channel comprises selecting a link equipped on said preferred one of said first and second nodes, wherein said allocated channel is a channel on said selected link;
   connecting a preferred one of said first and second resource connection points with said allocated channel, wherein said preferred resource connection point is associated with said preferred one of said first and second nodes;
   passing said connection request to the other one of said first and second nodes, wherein the second passed request includes said selected link and channel number; and
   connecting said other resource connection point to said allocated channel thereby completing said connection request.

2. The method of claim 1, further comprising:
   returning a completion response to said originating node.

3. The method of claim 1, wherein said determining step is performed by a connection control process on said receiving node.

4. The method of claim 1, wherein said passing said connection request to said preferred one of said first and second nodes comprises the step of:
   passing said connection request to a first connection control process of said preferred one of said first and second nodes.

5. The method of claim 1, wherein said passing said connection request to the other one of said first and second nodes comprises the step of:
   passing said connection request to a second connection control process of said other one of said first and second nodes.

6. The method of claim 1, wherein said virtual circuit network is a plurality of virtual circuits routed between said plurality of nodes connected to an Asynchronous Transfer Mode (ATM) network.

7. The method of claim 1, wherein at least one of said plurality of nodes is a processor based system selected from the group consisting of a computer and a server.

8. The method of claim 1, wherein said allocated channel is bandwidth allocated within a virtual circuit.

9. The method of claim 1, wherein said connection request is a Connection Control Process (CCP) Application Programming Interface (API) request made by an application program associated with said originating node.

10. The method of claim 9, wherein said application program provides a telecommunications based service.

11. The method of claim 9, wherein said application program is capable of originating, processing, and terminating outgoing telecommunication connections.

12. The method of claim 9, wherein said application program is capable of answering, processing, and terminating incoming telecommunication connections.

13. The method of claim 1, wherein said receiving node, said first node, and said second nodes are capable of processing Connection Control Process (CCP) Application Programming Interface (API) requests.

14. The method of claim 1, wherein said originating node and said receiving node are the same node.

15. The method of claim 1, wherein each of said first and second resource connection points (RCP) is a telecommunications resource controlled by a connection control process.

16. The method of claim 1, wherein said originating node and said preferred one of said first and second nodes are the same node.

17. The method of claim 1, wherein said originating node and said preferred one of said first and second nodes are different nodes.

18. The method of claim 1, wherein said preferred one of said first and second nodes is a node with a higher priority than the other node of said first and second nodes.

19. The method of claim 1, wherein said preferred one of said first and second nodes is a node with an identification number greater than the other one of said first and second nodes.

20. The method of claim 1, wherein said link is a link connected into an ATM network of said plurality of nodes.

21. The method of claim 1, wherein said link is selected from a plurality of links based on a load sharing criteria or based on a priority of said link.

22. The method of claim 1, wherein said selected link comprises a plurality of virtual circuits.

23. The method of claim 1, wherein said allocating channel step further comprises:
   allocating said channel on said selected link.

24. The method of claim 1, wherein said connecting said other resource connection point to said allocated channel comprises:
   verifying the availability of the selected link and channel; and
   connecting said other resource connection point to said allocated channel thereby completing said connection request.

25. The method of claim 1, wherein said virtual circuit network is an Asynchronous Transfer Mode (ATM) network.

26. The method of claim 1, wherein said connection request is a TCP/IP message.

27. The method of claim 1, wherein said allocated channel is an ATM channel.

28. The method of claim 1, wherein said link is an ATM link.

29. A method for allocating a channel on a virtual circuit network of a plurality of nodes, comprising:
   receiving a connection request on a receiving node, from an originating node, to establish a connection between a first resource connection point and a second resource connection point;
   determining a first node associated with said first resource connection point and a second node associated with said second resource connection point;
   passing said connection request to a preferred one of said first and second nodes;
   allocating the channel by said preferred one of said first and second nodes for connecting said first and second resource connection points, wherein said allocating the channel comprises selecting a link equipped on said preferred one of said first and second nodes, wherein said allocating the channel further comprises allocating said channel on said selected link, wherein said allocated channel is a channel selected from the group consisting of a first available channel on said link, a lowest numbered channel available on said link, a highest numbered channel available on said link, and a spare channel in a virtual circuit on said link;
   connecting a preferred one of said first and second resource connection points with said allocated channel, wherein said preferred resource connection point is associated with said preferred one of said first and second nodes;
   passing said connection request to the other one of said first and second nodes; and
   connecting said other resource connection point to said allocated channel thereby completing said connection request.

30. The method of claim 29, wherein said virtual circuit is not set to a hold closed timeout state.

31. A method for allocating a channel on a virtual circuit network of a plurality of nodes, comprising:
   receiving a connection request on a receiving node, from an originating node, to establish a connection between a first resource connection point and a second resource connection point;
   determining a first node associated with said first resource connection point and a second node associated with said second resource connection point;
   passing said connection request to a preferred one of said first and second nodes;
   allocating the channel by said preferred one of said first and second nodes for connecting said first and second resource connection points, wherein said allocating the channel comprises selecting a link equipped on said preferred one of said first and second nodes, wherein said allocating the channel further comprises allocating said channel on said selected link, wherein channels on said link are sequentially allocated;
   connecting a preferred one of said first and second resource connection points with said allocated channel, wherein said preferred resource connection point is associated with said preferred one of said first and second nodes;
   passing said connection request to the other one of said first and second nodes; and
   connecting said other resource connection point to said allocated channel thereby completing said connection request.

32. A method for allocating a channel on a virtual circuit network of a plurality of nodes, comprising:
   receiving a connection request on a receiving node, from an originating node, to establish a connection between a first resource connection point and a second resource connection point;
   determining a first node associated with said first resource connection point and a second node associated with said second resource connection point;
   passing said connection request to a preferred one of said first and second nodes;
   allocating the channel by said preferred one of said first and second nodes for connecting said first and second resource connection points, wherein said allocating the channel comprises selecting a link equipped on said preferred one of said first and second nodes, wherein said allocated channel is a channel on said selected link, wherein said selected link comprises a plurality of virtual circuits, wherein at least one of said plurality of virtual circuits has a plurality of virtual circuit channels associated with it, and wherein said allocated channel is one of said plurality of virtual circuit channels;
   connecting a preferred one of said first and second resource connection points with said allocated channel, wherein said preferred resource connection point is associated with said preferred one of said first and second nodes;
   passing said connection request to the other one of said first and second nodes; and
   connecting said other resource connection point to said allocated channel thereby completing said connection request.

33. A method for allocating a channel on a virtual circuit network of a plurality of nodes, comprising:
   receiving a connection request on a receiving node, from an originating node, to establish a connection between a first resource connection point and a second resource connection point;
   determining a first node associated with said first resource connection point and a second node associated with said second resource connection point;
   passing said connection request to a preferred one of said first and second nodes;
   allocating the channel by said preferred one of said first and second nodes for connecting said first and second resource connection points, wherein said allocating the channel comprises selecting a link equipped on said preferred one of said first and second nodes, wherein said allocating the channel further comprises allocating said channel on said selected link, wherein said allocating the channel further comprises translating said allocated channel to a virtual circuit number and a virtual circuit channel number;

connecting a preferred one of said first and second resource connection points with said allocated channel, wherein said preferred resource connection point is associated with said preferred one of said first and second nodes;

passing said connection request to the other one of said first and second nodes; and connecting said other resource connection point to said allocated channel thereby completing said connection request.

34. A method for de-allocating a channel on a virtual circuit network of a plurality of nodes, comprising:

receiving a disconnection request on a receiving node from an originating node to disconnect a connection between a first resource connection point and a second resource connection point;

determining a first node associated with said first resource connection point and a second node associated with said second resource connection point;

passing said received disconnection request to a preferred one of said first and second nodes;

disconnecting a preferred one of said first and second resource connection points from a virtual circuit channel associated with said one resource connection point, wherein said preferred resource connection point is associated with said preferred one of said first and second nodes, wherein said disconnecting a preferred resource connection point further comprises de-allocating said channel associated with said one resource connection point;

passing said disconnection request to the other one of said first and second nodes;

disconnecting said other resource connection point from said channel thereby completing said disconnection request;

setting a virtual circuit associated with said de-allocated channel on said preferred node to a predetermined hold open timeout state if said virtual circuit channel is a last channel on said virtual circuit; and waiting to receive a virtual circuit close message from said other node within a hold open timeout period.

35. The method of claim 34, further comprising:

sending a completion response to said originating node.

36. The method of claim 34, wherein said disconnecting said other resource connection point step further comprises the step of:

deallocating said channel associated with said other resource connection point.

37. The method of claim 34, wherein said determining step is performed by a connection control process on said receiving node.

38. The method of claim 34, wherein said passing said received disconnection request to said preferred node step comprises the step of:

passing said disconnection request to a first connection control process of said preferred one of said first and second nodes.

39. The method of claim 34, wherein said passing said received disconnection request to said other node step comprises the step of:

passing said disconnection request to a second connection control process of said other one of said first and second nodes.

40. The method of claim 34, wherein at least one of said plurality of nodes is a processor based system selected from the group consisting of a computer and a server.

41. The method of claim 34, wherein said disconnection request is a connection control process (CCP) Application Programming Interface (API) request made by an application program associated with said originating node.

42. The method of claim 41, wherein said application program provides a telecommunications based service.

43. The method of claim 34, wherein said receiving node, said first node, and said second node are nodes capable of processing CCP API requests.

44. The method of claim 34, wherein said originating node and said receiving node are the same node.

45. The method of claim 34, wherein each of said first and second resource connection point (RCP) is a telecommunications resource controlled by a connection control process.

46. The method of claim 34, wherein said originating node and said preferred one of said first and second nodes are the same node.

47. The method of claim 34, wherein said preferred one of said first and second nodes is a node with a lower priority than said other one node of said first and second nodes.

48. The method of claim 34, wherein said preferred one of said first and second nodes is a node with an identification number less than said other one of said first and second nodes.

49. The method of claim 34, wherein said second passed request includes information regarding said first passed request.

50. The method of claim 34, wherein said predetermined hold open timeout period is about three seconds.

51. The method of claim 34, further comprising:

canceling said preferred node virtual circuit hold opened timeout state upon receiving said virtual circuit closed message from said other node;

closing said preferred node virtual circuit;

releasing said closed virtual circuit for reuse; and sending a the virtual circuit close message from said preferred node to said other node.

52. The method of claim 34, further comprising:

canceling said preferred node virtual circuit hold opened timeout state if said virtual circuit close message is not received by said preferred node within said hold open timeout period; and reporting a system error.

53. The method of claim 34, wherein said originating node has an application program associated with it.

54. The method of claim 34, wherein said virtual circuit network is an Asynchronous Transfer Mode (ATM) network.

55. A method for de-allocating a channel on a virtual circuit network of a plurality of nodes, comprising:

receiving a disconnection request on a receiving node from an originating node to disconnect a connection between a first resource connection point and a second resource connection point;

determining a first node associated with said first resource connection point and a second node associated with said second resource connection point;

passing said received disconnection request to a preferred one of said first and second nodes;

disconnecting a preferred one of said first and second resource connection points from a virtual circuit channel associated with said one resource connection point, wherein said preferred resource connection point is associated with said preferred one of said first and second nodes;

passing said disconnection request to the other one of said first and second nodes;

disconnecting said other resource connection point from said channel thereby completing said disconnection request, wherein said disconnecting said other resource connection point comprises deallocating said channel associated with said other resource connection point;

closing a virtual circuit associated with said de-allocated channel on said other node if said de-allocated channel is a last channel on said virtual circuit;

setting said virtual circuit associated with said de-allocated channel on said other node to a predetermined hold closed timeout state;

sending a virtual circuit close message to said preferred node; and waiting to receive a virtual circuit close message from said preferred node within a hold close timeout period.

56. The method of claim 55, wherein said predetermined hold close timeout period is about six seconds.

57. The method of claim 55, further comprising:

canceling said other node virtual circuit hold closed timeout state upon receiving said virtual circuit close message from said preferred node; and releasing said closed virtual circuit for reuse.

58. The method of claim 55, further comprising:

canceling said other node virtual circuit hold closed timeout state if said virtual circuit close message is not received by said other node within said hold close timeout period;

releasing said other node virtual circuit for reuse; and reporting a system error.

* * * * *